Oct. 28, 1969　　　R. J. SMITH　　　3,474,766
OSCILLATING PISTON ROTARY ENGINE
Filed Jan. 22, 1968　　　3 Sheets-Sheet 1

Ralph J. Smith
INVENTOR.

BY *Clarence A. O'Brien*
and *Harvey B. Jacobson*
Attorneys

Oct. 28, 1969 R. J. SMITH 3,474,766
OSCILLATING PISTON ROTARY ENGINE
Filed Jan. 22, 1968 3 Sheets-Sheet 2
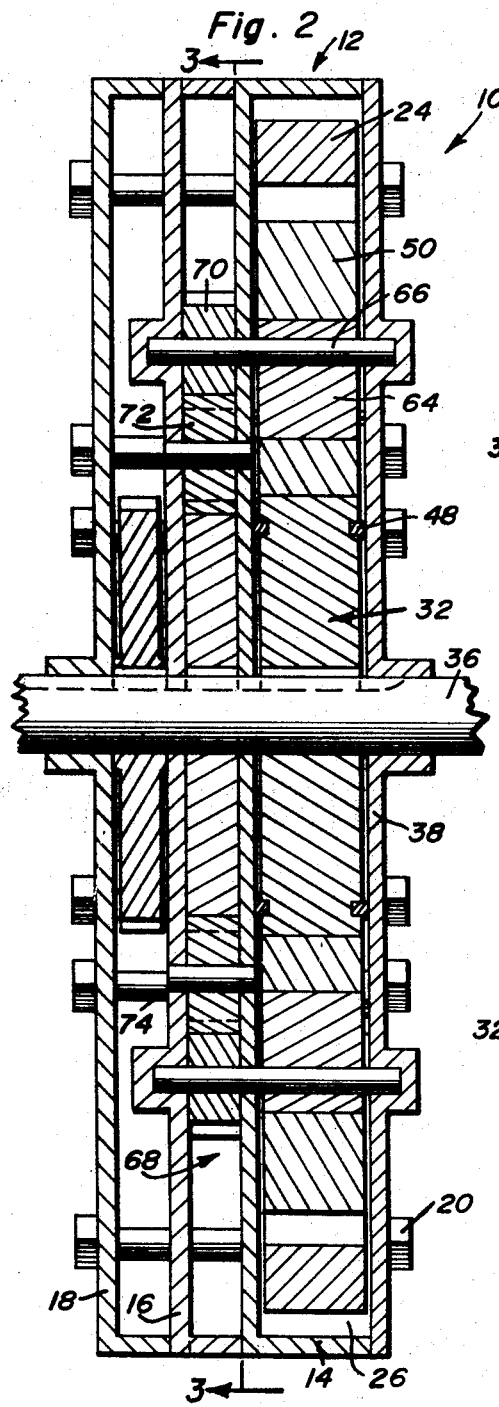
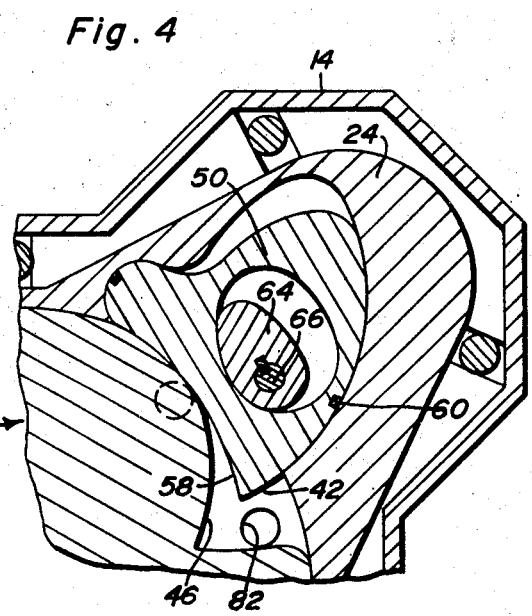
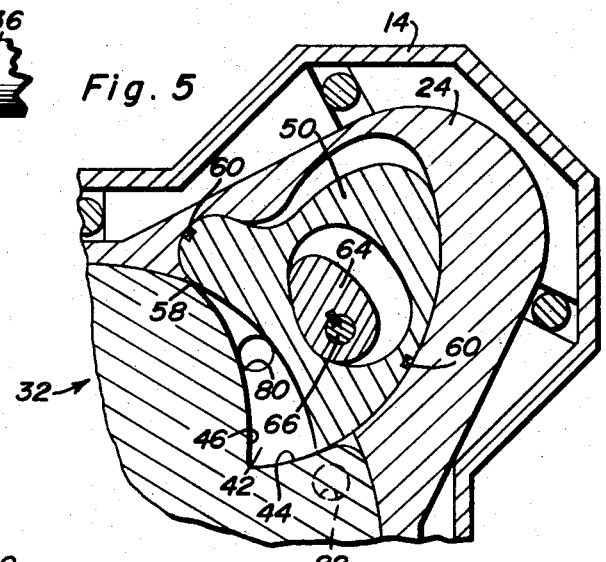
Ralph J. Smith
INVENTOR.

Oct. 28, 1969  R. J. SMITH  3,474,766

OSCILLATING PISTON ROTARY ENGINE

Filed Jan. 22, 1968  3 Sheets-Sheet 3

Ralph J. Smith
INVENTOR.

United States Patent Office

3,474,766
Patented Oct. 28, 1969

3,474,766
OSCILLATING PISTON ROTARY ENGINE
Ralph J. Smith, Box 74, East Killingly, Conn. 06243
Filed Jan. 22, 1968, Ser. No. 699,412
Int. Cl. F02b 53/00; F01c 1/30
U.S. Cl. 123—15                              4 Claims

ABSTRACT OF THE DISCLOSURE

An internal combustion engine of the rotary type in which oscillating piston members are displaced into peripheral pockets formed in a rotor to compress and expand chambers formed between the rotor and the housing. A gear driven cam assembly synchronizes oscillating movement of the piston members with rotation of the rotor for controlling the intake, ignition and exhaust phases of each operational cycle.

---

This invention relates to internal combustion engines and more particularly to a fluid engine of the variable volume chamber type employing oscillating pistons and a continuously rotating rotor with which the pistons cooperate to compress and expand combustion chambers formed therebetween.

In accordance with the present invention, an internal combustion engine is provided having a water-cooled housing within which a cylindrical, pressure-sealed compartment is formed communicating with cavities extending radially therefrom. A rotor is mounted for rotation within the pressure-sealed compartment and is provided with peripheral pockets which periodically are aligned with the radial cavities as the rotor rotates. Lever type piston members are pivotally mounted by the housing within the aforementioned cavities and are arranged to oscillate between positions projecting into the pressure-sealed compartment and retracted positions entirely within the cavities. When angularly displaced into the pressure-sealed compartment, the oscillating piston members enter the pockets in the rotor in order to compress fluid within pressure chambers formed by the pockets within the compartment. These pressure chambers are of course expanded in volume as the piston members are retracted into their cavities. Spark ignition devices, intake ports and exhaust ports are mounted by the housing in spaced relation to each other for communication with the pressure compartment adjacent different cavities for communication with the pressure chambers at the proper phases of an operational cycle. Toward this end, the oscillating movements of the piston members are synchronized to rotation of the rotor by a system of gears and cam drives for the piston members.

The construction and operation of the engine is such as to obtain output power at a high fuel economy ratio. Further, because of constructional simplicity, manufacturing and maintenance costs are relatively low.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side sectional view through the engine taken substantially through a plane indicated by section line 2—2 in FIGURE 1.

FIGURES 4 and 5 are front sectional views of portions of the engine in different operational phases.

Figure 1:
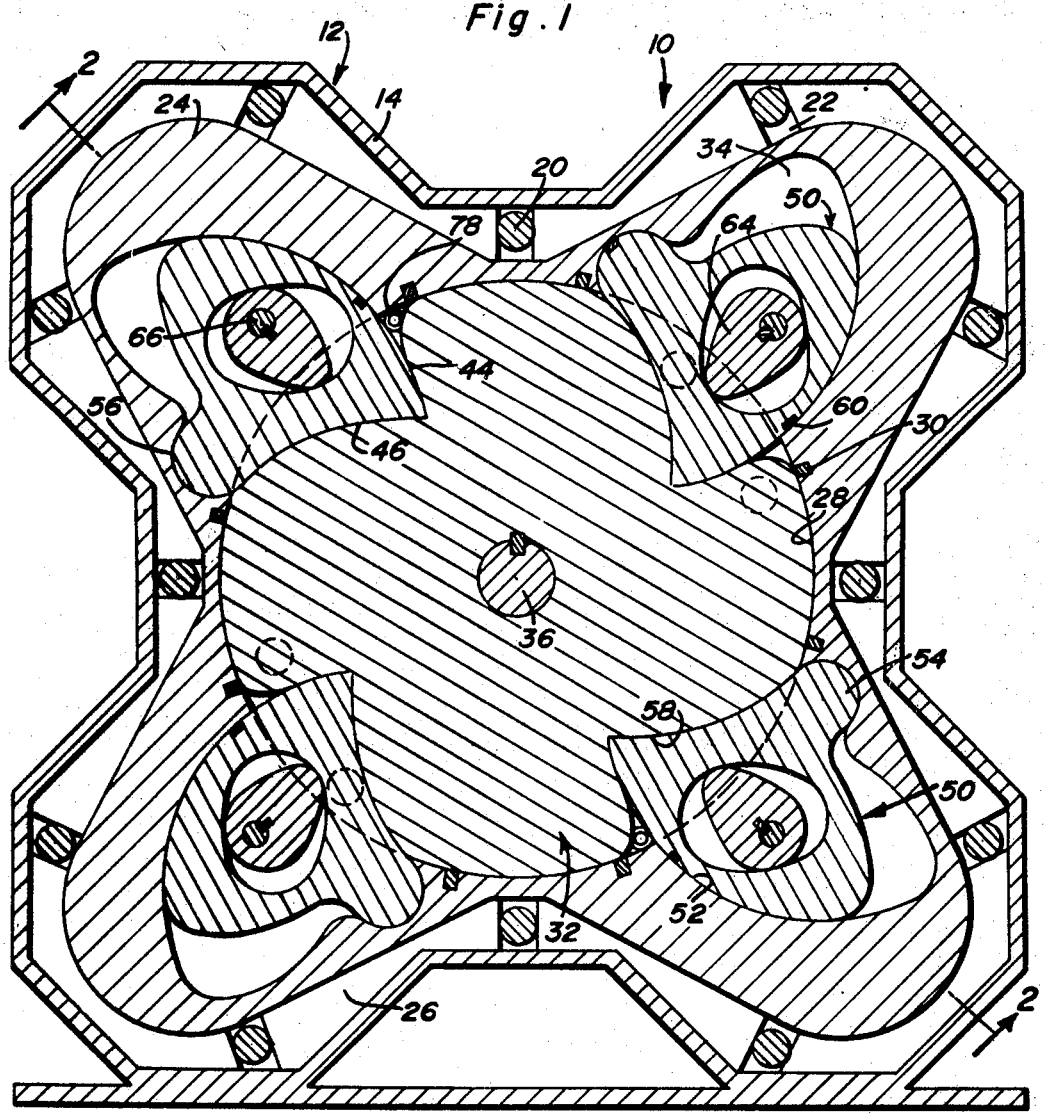
FIGURE 1 is a front sectional view through an internal combustion engine constructed in accordane with the present invention, shown in one operational phase.
Figure 6:
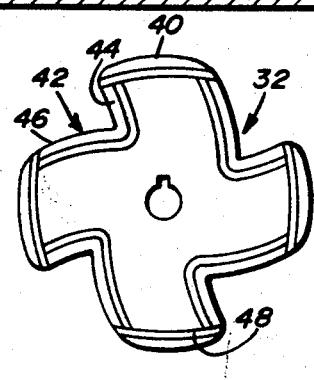
FIGURE 6 is a front elevational view of the rotor associated with the engine.
Figures 3, 7:
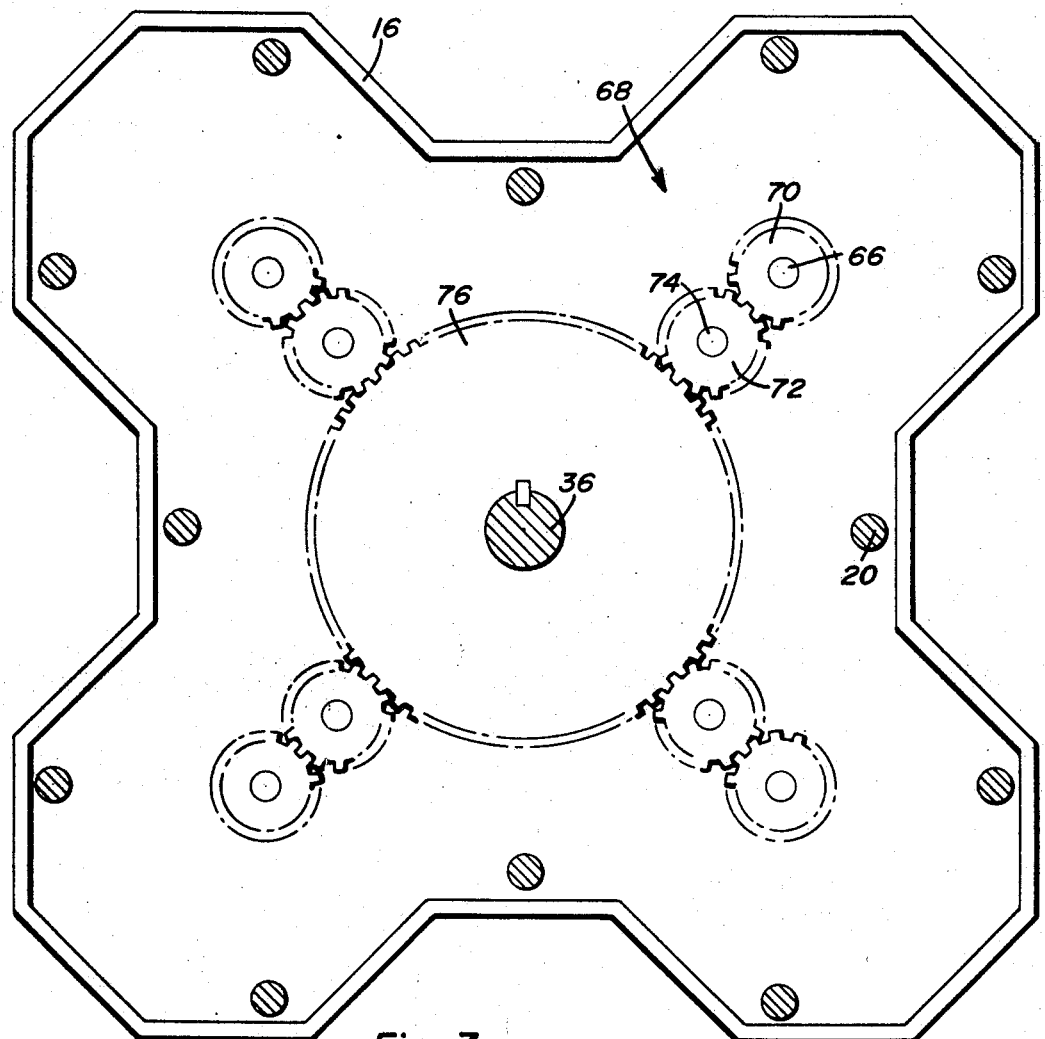
FIGURE 3 is a sectional view taken substantially through a plane indicated by section line 3—3 in FIGURE 2.
FIGURE 7 is a front elevational view of one of the piston members associated with the engine.

Referring now to the drawings in detail, FIGURES 1, 2 and 3 illustrate one embodiment of an internal combustion engine constructed in accordance with the present invention which is generally denoted by reference numeral 10. The engine includes a housing assembly generally referred to by reference numeral 12. The housing assembly includes an outer jacket 14 to which a gear housing section 16 and an end cover section 18 are fastened by a plurality of fastener assemblies 20. Fixedly mounted within the jacket 14, by means of a plurality of spacers 22, is a rotor housing 24. Water cooling spaces 26 are formed between the jacket 14 and the housing 24. The rotor housing 24 is provided with a cylindrical compartment 28, the annular wall of which is provided with circumferentially spaced sealing elements 30 for wiping engagement with a rotor generally referred to by reference numeral 32. Also formed within the housing 24 extending radially from the cylindrical compartment 28, are a plurality of cavities 34, four of such cavities being shown in the illustrated embodiment spaced apart by substantially 90° relative to the rotational axis of the rotor 32 which coincides with the axis of the cylindrical compartment 28 within which the rotor is mounted.

The rotor 32 is splined to a power shaft 36 that extends through the housing assembly 12 and is journaled between the end wall 38 associated with the jacket 14 and the housing cover 18. In the illustrated embodiment, the rotor incudes four lobe portions formed by radially outer cylindrical surfaces 40 that wipingly engage the sealing elements 30 of the compartment 28 and peripheral pockets 42 formed between a thrust-absorbing face 44 and an inclined piston sliding surface 46. Opposite axial sides of the rotor are also provided with sealing elements 48 disposed in close spaced relation to the peripheral contour of the rotor for wiping engagement with the side walls of the housing.

Associated with each of the housing cavities 34, is a lever piston member generally referred to by reference numeral 50. As shown in FIGURES 1 and 7, each piston member includes an arcuate surface portion 52 having a center of curvature located within a pivotal mounting projection 54 received within a pivotal bearing cavity portion 56 of the cavity. Accordingly, the piston member is pivotally mounted for oscillating movement about a fixed pivotal axis. Extending between the arcuate portion 52 of the piston member and the pivot projection 54, is a pressure face 58 adapted to be displaced into the pressure compartment 28 and retracted therefrom substantially flush with the cylindrical outer surface of the compartment 28. In order to maintain the compartment 28 pressure sealed, each piston member 50 is provided with a sealing element 60 for wiping engagement with the housing walls within the cavities 34 closely spaced from the pressure face 58 as more clearly seen in FIGURE 7.

Each of the piston members is also provided with an internal cam surface 62 adapted to be engaged by a cam member 64. Each cam member is rotatably mounted about a fixed axis by a camshaft 66 journaled by the housing assembly and extending through each cavity 34. The contours of the internal cam surface 62 and the cam member 64 are such as to produce a positive pivotal displacement of the piston member about a fixed axis established through the pivotal projection 54 between a position projecting into the pressure compartment 28 and a position fully retracted within the cavity 34. Further, the cam profiles are such as to retain each piston member in its retracted position for a dwell period during constant rotation of the camshaft 66. The foregoing motion of the piston members is synchronized to the rotation of the rotor 32 by means of a synchronizing gear assembly 68 located within the gear housing section 16.

As shown in FIGURES 2 and 3, the gear assembly includes a pinion gear 70 connected to each of the camshafts 66 through which constant rotation is imparted to the cam member 64 as aforementioned. The pinion gears 70 are enmeshed with idler gears 72 rotatably mounted on the pins 74, the idler gears being in turn enmeshed with a central drive gear 76 splined to the power shaft 36. Thus, all of the camshafts 66 are simultaneously rotated in the same direction as the rotor 32 and at a higher rotational speed. In the illustrated embodiment in which the rotor is provided with four lobes and wherein four piston members are provided, the camshafts 66 are driven at four times the speed of the rotor. Thus, as the rotor is rotated through 90° of rotation, each piston member is oscillated through one complete stroke corresponding to a full revolution of its cam member 64 and camshaft 66.

As shown in FIGURE 1, the housing mounts a spark ignition device 78 adjacent the outer periphery of the compartment 28 where it communicates with one of the cavities 34. Also communicating with the compartment 28 adjacent its periphery and the next cavity 34 spaced from the spark ignition device 78, is an exhaust port 80 as shown by dotted line. Also, on the trailing side of this cavity 34 close to the periphery of the compartment 28 is an intake port 82. On the trailing side of the next cavity 34 following intake port 82 is a second spark ignition device spaced 180° from the first-mentioned spark device. Second exhaust and intake ports are similarly located about the periphery of the compartment 28 180° from the first-mentioned exhaust and intake ports for cooperation with the rotor and piston members in order to simultaneusly produce four operational cycles as the rotor undergoes 180° rotation. Successive cycles are accordingly produced during each revolution of the rotor in order to effect a smooth power output.

FIGURE 1 illustrates the engine during a power phase of its operational cycle in which two of the piston members have compressed to a minimum the fuel mixture supplied to the pressure chambers formed within the pockets 42 of the rotor. In this position of the piston members, the pressure faces 58 of the piston members substantially contact the faces 46 of the pockets leaving a relatively small volume between the pockets and the annular wall of the compartment 28 to which the spark ignition devices 78 are exposed adjacent two of the piston members. When ignition occurs at this point, the pressure chambers are expanded by causing angular displacement of the rotor in a clockwise direction as viewed in FIGURE 1 by virtue of the explosive gases exerting force against the faces 44 in two of the pockets. At the same time, the piston members begin their return strokes toward the retracted positions. As the pockets 42 move out of registry with the cavities 34, intake ports 82 are uncovered and communicate with expanding pockets as illustrated in FIGURE 4, to draw in a charge of fuel during an intake phase of the cycle. When fully retracted, the piston members are held in their retracted positions during a cam dwell period until the rotor pockets 42 approach alignment with the cavities 34 as shown in FIGURE 5. The piston members then begin their forward stroke advancing into the space provided by the rotor pockets after uncovering the exhaust ports 80 to displace combustion products through the exhaust ports 80 in two of the pressure chambers while fuel charges are being volumetrically compressed in the other two chambers during the exhaust and compression phase of the operational cycle. A cycle is completed for two of the rotor pockets during 180° rotation of the rotor overlapping by 90° the cycles associated with the other two rotor pockets in the illustrated embodiment in view of the pair of spark ignition devices, exhaust ports and intake ports utilized in association with the four piston members. Further, successive operational cycles begin each 90° rotation of the rotor. It will therefore be appreciated that an extremely smooth and continuous generation of power is realized once the engine is started by rotation of the rotor through the starting gear 84 keyed to the power shaft 36 as shown in FIGURE 2.

What is claimed as new is as follows:

1. In a fluid power device, a housing enclosing a pressure sealed compartment, a rotor mounted for rotation within said compartment having at least one pocket peripherally formed therein to form a pressure chamber within the compartment, piston means pivotally mounted by the housing for movement into said compartment, synchronizing drive means operatively connecting the rotor to the piston means for displacement of the piston means into said pocket of the rotor and retraction from the compartment during rotation of the rotor, exhaust means mounted by the housing for conducting fluid from the pressure chamber in response to compression thereof by said displacement of the piston means into the pocket of the rotor and intake means mounted by the housing for conducting fluid into the pressure chamber in response to expansion thereof by retraction of the piston means from the compartment, said piston means including an arcuate element retractable into a cavity formed in the housing radially outwardly of the compartment, said element having an internal cam surface engageable by the drive means and sealing means in wiping engagement with the housing within said cavity.

2. The combination of claim 1 wherein said fluid conducted into the presure chamber is a fuel mixture, and ignition means mounted by the housing in spaced relation to to the intake means for igniting the fuel mixture when compressed within the pressure chamber by the piston means.

3. The combination of claim 1 wherein said synchronizing drive means comprises cam means engageable with the piston means for displacement thereof from a position within the pocket of the rotor to a retracted position for a dwell period, and gear means drivingly connecting the cam means to the rotor for movement of the pocket into or out of registration with the piston means during said dwell period.

4. The combination of claim 1 wherein said fluid conducted into the pressure chamber is a fuel mixture, and ignition means mounted by the housing in spaced relation to the intake means for igniting the fuel mixture when compressed within the pressure chamber by the piston means.

References Cited

UNITED STATES PATENTS 1,348,103    7/1920    George _____ 123—15

FOREIGN PATENTS 958,729    2/1957    Germany.

C. J. HUSAR, Primary Examiner

U.S. Cl. X.R.

103—124; 230—149